(12) United States Patent
Jenkins et al.

(10) Patent No.: US 7,324,722 B2
(45) Date of Patent: Jan. 29, 2008

(54) HOLLOW CORE MULTI-MODE INTERFERENCE OPTICAL DEVICE

(75) Inventors: Richard M Jenkins, Worcestershire (GB); Mark E McNie, Worcestershire (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 10/533,433

(22) PCT Filed: Nov. 3, 2003

(86) PCT No.: PCT/GB03/04723

§ 371 (c)(1),
(2), (4) Date: May 2, 2005

(87) PCT Pub. No.: WO2004/042443

PCT Pub. Date: May 21, 2004

(65) Prior Publication Data

US 2006/0098915 A1 May 11, 2006

(30) Foreign Application Priority Data

Nov. 2, 2002 (GB) ................................ 0225595.8

(51) Int. Cl.
*G02F 1/035* (2006.01)
*G02B 6/26* (2006.01)
(52) U.S. Cl. ............................................. 385/28; 385/3
(58) Field of Classification Search ............... 385/3, 385/28
See application file for complete search history.

(56) References Cited

U.S. PATENT DOCUMENTS 5,379,354 A   1/1995 Jenkins et al.
5,428,698 A * 6/1995 Jenkins et al. ................ 385/27
7,042,631 B2 * 5/2006 Smith et al. .................. 359/333

FOREIGN PATENT DOCUMENTS

EP   0 903 616 A2   3/1999
WO   03/065088 A2   8/2003

OTHER PUBLICATIONS

T. Saida et al., "Silica-Based 2X2 Multimode Interference Couplers With Arbitrary Power Splitting Ratio", Extended Abstras of the International Conference on Solid State Devices and Materials, Japan Society of Applied Physics, 1999, pp. 458-459, XP000935168.
S. Lee et al., "INGAAS/INP Multimode Interference Splitter with Variable Splitting Ratio", Proceedings of the SPIE, vol. 3944, Jan. 24, 2000, pp. 673-678, XP009018192.
R. Dangel et al., "Electro-nanomechanically actuated integrated-optical interferometric intensity modulators and 2x2 space switches", Optics Communications, vol. 156, No. 1-3, Nov. 1, 1998, pp. 63-76, XP004143048.
T. Miura et al, "Modeling and Fabrication of Hollow Optical Waveguide for Photonic Integrated Circuits" *Jpn. J. Appl. Phys.*, vol. 41, Part 1, No. 7B, Jul. 2002, pp. 4785-4789.

* cited by examiner

*Primary Examiner*—Michelle Connelly-Cushwa
*Assistant Examiner*—Jerry T Rahll
(74) *Attorney, Agent, or Firm*—Nixon & Vanderhye P.C.

(57) ABSTRACT

A hollow core multi-mode interference (MMI) device is described that comprises a multi-mode waveguide (10, 14) optically coupled to at least two fundamental mode waveguides (8, 12, 16). The device is characterised in that it comprises a means for varying the internal cross-sectional dimensions of a portion of one or more of said at least two fundamental mode waveguides. In particular, the side wall of a fundamental mode waveguide having a substantially square cross-section can be moved using micro-electro mechanical systems (MEMS). Various optical routing devices incorporating such MMI devices are described.

12 Claims, 3 Drawing Sheets

HOLLOW CORE MULTI-MODE INTERFERENCE OPTICAL DEVICE

Figure 1:
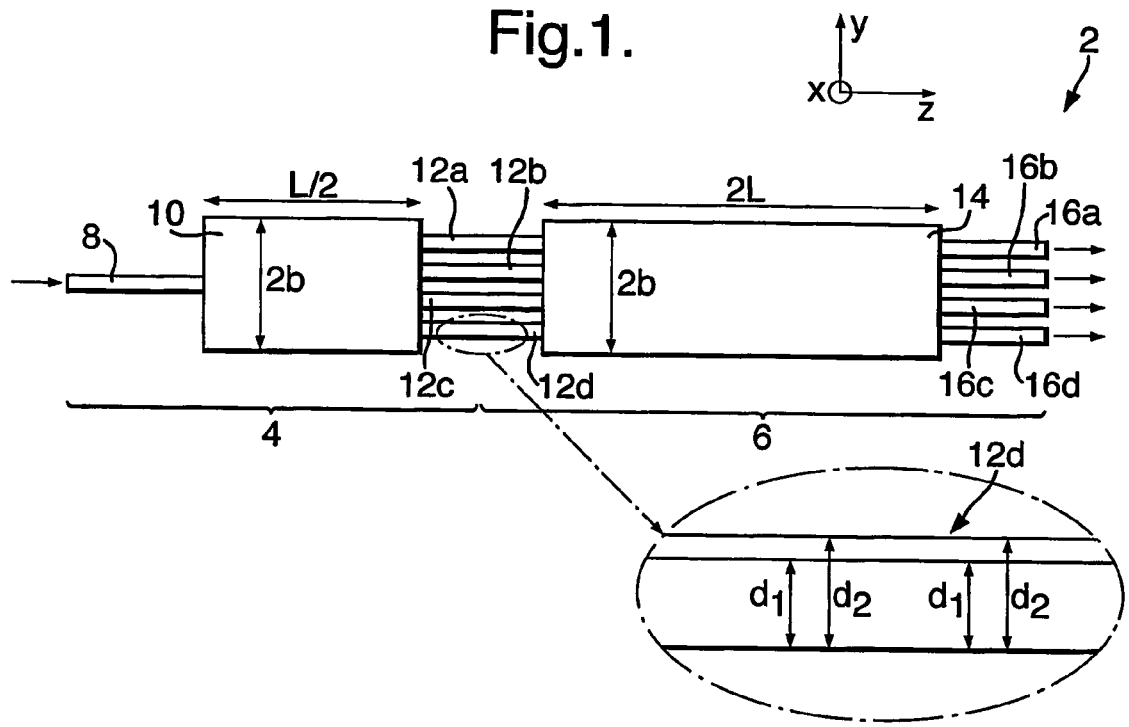

This application is the US national phase of international application PCT/GB2003/004723 filed 3 Nov. 2003 which designated the U.S. and claims priority of GB 0225595.8, filed 2 Nov. 2002, the entire contents of each of which are hereby incorporated by reference.

This invention relates to a multi-mode interference (MMI) device, and in particular to optical routing devices incorporating one or more multi-mode interference devices.

U.S. Pat. No. 5,410,625 describes a multi-mode interference (MMI) device for beam splitting and recombining. The device comprises a first coupling waveguide and two or more second coupling waveguides that are optically connected to a central multi-mode waveguide region. The coupling waveguides operate only in fundamental mode, and the physical characteristics of the coupling and multi-mode waveguide regions are selected such that modal dispersion within the central multi-mode waveguide region provides for a single beam of light input in to the first coupling waveguide to be split into the two or more second coupling waveguides. The device may also be operated in reverse as a beam combiner.

Variations and improvements to the basic MMI devices of U.S. Pat. No. 5,410,625 are also known. U.S. Pat. No. 5,379,354 describes how variation of input waveguide location can be used to obtain a multi-way beam splitter that provides division of the input radiation into outputs beams having differing intensities. Use of MMI devices to form laser cavities has also been demonstrated; for example see U.S. Pat. No. 5,675,603.

U.S. Pat. No. 5,428,698 describes various signal routing devices incorporating hollow and solid core MMI devices. In one such device, the outputs of an MMI beam-splitter device are optically connected via a set of relay waveguides to the inputs of an MMI beam-recombiner device. The arrangement is such that a single laser beam input to the MMI beam-splitter can be transferred to any one or more of the output waveguides of the MMI beam recombiner by the application of different sets of phase shifts to light as it propagates through the relay waveguides. A so-called "star coupler" device is also described in which a single MMI device is configured to operate as both the beam splitter and beam recombiner.

U.S. Pat. No. 5,428,698 teaches how reflective or transmissive phase shifting means may be used to introduce the required relative phase shifts to light propagating through the relay waveguides. In hollow core devices, the transmissive phase shifting means (typically electro-optic modulators) are located in the hollow channels defining the relay waveguides. The use of hollow core relay waveguides that incorporate moveable mirrors to alter the path length of the relay waveguides, thereby operating as reflective phase shifting means, are also described.

A disadvantage of hollow core signal routing devices incorporating transmissive phase shifting means is that the total optical power that can be passed through the device is limited by the optical power that the transmissive phase shifting element can handle. The signal routing devices incorporating reflective phase shifters as described in U.S. Pat. No. 5,428,698 also have certain disadvantages. For example, an overlap of the beams propagating in the relay waveguide is required and can introduce cross-talk that reduces the overall efficiency of the device. Alignment of the mirror position and accurate control of mirror movement is also critical; any alignment errors will significantly increase optical losses in the relay waveguides thereby reducing the overall efficiency of the routing device.

According to a first aspect of the present invention a hollow core multi-mode interference device comprises a multi-mode waveguide optically coupled to at least two fundamental mode waveguides, and is characterised in that the device comprises a means for varying the internal cross-sectional dimensions of a portion of one or more of said at least two fundamental mode waveguides.

Variation of the cross-sectional dimensions of the fundamental mode waveguides in an MMI device of the present invention provides a convenient means of controlling the phase of light as it passes through a certain length of the fundamental mode waveguide. This phase shift arises because the variation in the waveguide cross-sectional dimension alters the wavelength (or phase coefficient) of the fundamental mode of the waveguide. The amount of variation required to impart the required phase shift is described in more detail below with reference to FIG. 5.

As an example, consider an MMI device operating as a beam splitter. A single incident beam could be split into N (where N>2) beams by modal dispersion in the multi-mode waveguide region and each of these beams could be coupled into a fundamental mode waveguide. Variation of the cross-sectional dimensions of one or more of the fundamental mode waveguides would then permit phase differences to be introduced between the N beams propagating through each fundamental mode waveguide. Similarly, in an MMI N-beam recombiner, control of the relative phase of beams prior to recombination in the multi-mode region would be possible.

Optical devices (routers, switches etc) fabricated using an MMI device of the present invention do not require the inclusion of transmissive phase shifting elements. This enables higher optical powers to be handled. Previously, moveable mirror phase shifters were implemented using highly reflective mirrors arranged in an optical layout in which movement of the mirror effectively altered the path length of the fundamental mode waveguide(s). As grazing angle reflectivity is inherently higher than near normal incidence reflectivity, the requirement to provide highly reflective mirrored surfaces is overcome by the present invention. Furthermore, the present invention does not require the specific optical layouts disclosed in the prior art to implement moveable mirror phase shifting.

Variation of the internal cross sectional dimensions of the fundamental mode waveguide may be achieved in a variety of ways. In the examples described with reference to FIGS. 1 and 3, light propagates through a substantially square cross-section fundamental mode waveguide along the z-axis. The cross-section of the waveguide is thus in the x-y plane, and movement of a side wall in the y-axis direction (i.e. changing the width of the waveguide) varies the cross sectional dimensions of the waveguide. Alternatively, or additionally, the waveguide dimensions could be varied in the x-direction (i.e. the height of the waveguide could be altered).

It should be noted that when hollow core optical waveguide structures are produced, the hollow core is likely to fill with air. Herein the refractive index of the core is thus assumed to be that of air at atmospheric pressure and temperature (i.e. n≈1). However, this should be seen in no way as limiting the scope of this invention. The hollow core may contain any fluid (for example an inert gas such as nitrogen) or be a vacuum. The term hollow core simply means a core which is absent any solid material.

Advantageously, at least one of the fundamental mode waveguides has a substantially square cross-section. The term substantially square cross-section should be taken to include waveguides that are approximately square albeit having some degree of side wall movement. As described below with reference to FIGS. 1 and 3, one or more of the hollow core substantially square fundamental mode waveguides could be formed in a base portion of material and a lid placed thereon. The hollow waveguides would have side walls, and one or both of these could be moveable to allow alteration of the cross sectional dimensions (e.g. the width) of the waveguide.

Although substantially square waveguides are preferred for ease of fabrication, a skilled person would appreciate that the invention could be implemented using fundamental mode waveguides of any shape (e.g. v-shaped, rectangular, circular, elliptical etc.).

Conveniently, the internal surfaces of the hollow core waveguides are coated with reflective material.

As described in WO 03/065088 (the contents of which are incorporated herein by reference thereto) a reflective coating may also be applied to the surfaces forming the hollow core waveguides to enhance reflectivity at the wavelength of operation and thereby reduce optical losses associated with the device.

Conveniently, the hollow core waveguides are formed in semiconductor material; for example silicon or III-v semiconductor materials such as GaAs, InGaAs, AlGaAs or InSb. The semiconductor material may be provided in wafer form. Advantageously, the devices are formed using semiconductor micro-fabrication techniques. Preferably, such micro-fabrication techniques provide fundamental mode waveguides having cross-sections of less than 3 mm, or more preferably less than 1 mm It should be noted that the devices may be produced in a variety of ways. The waveguides may be formed in unitary pieces of material, they may be formed from two separate pieces of material (such as a base and a lid) or they may be formed from a plurality of different pieces of material (e.g. separate sections of material that, when located together, define the required fundamental mode and multi-mode waveguide regions).

Advantageously, the means for varying the cross-sectional dimensions of a portion of said fundamental mode waveguide comprises micro-electro-mechanical system (MEMS) actuation means.

For example, the waveguides may comprises side walls which are moveable using MEMS technology. The moveable portion of the waveguide may be formed as an integral part of the substrate or fabricated separately and integrated in a hybrid fashion to form the moveable portion of the waveguide. In the case of a device formed from a base and lid, the MEMS means could be formed on the lid section and integrated with the base during the lidding process.

Alternatively, the means for varying the internal cross-sectional dimensions of a portion of said fundamental mode waveguide may be arranged such that the fundamental mode waveguide dimensions are variable in response to an externally applied force. A motion or displacement sensor may thus be provided in which an external force is used to alter the internal cross-sectional dimensions of the fundamental waveguide.

According to a second aspect of the present invention a device for routing radiation comprising at least one device according to the first aspect of the present invention.

According to a third aspect of the present invention, an optical router comprises at least one fundamental mode input waveguide optically coupled to an MMI beam splitter, the MMI beam splitter also being optically coupled, via two or more relay waveguides, to an MMI beam recombiner having two or more fundamental mode output waveguides, wherein the relay waveguides comprise a means for altering the relative phases between the two or more beams propagating though the relay waveguides such that radiation received from the fundamental mode input waveguide may be selectably routed to any one of the two or more fundamental mode output waveguides, and is characterised in that the means for altering the relative phases between the two or more beams comprises a means for varying the cross-sectional dimensions of a portion of one or more of the relay waveguides.

According to a fourth aspect of the present invention an optical router comprises a multi-mode waveguide region optically coupled to a plurality of input/output fundamental mode waveguides and a plurality of relay waveguides, the router being configured to receive a beam of radiation via one of the plurality of input/output fundamental mode waveguides and, via modal dispersion in the multi-mode waveguide region, to divide the received beam into a plurality of beams which are coupled in the relay waveguides, wherein the relay waveguides comprise a means for altering the relative phases between the plurality of beams and each relay waveguide is terminated with a reflective means such that radiation is returned to the multi-mode waveguide region and, dependent on the relative phases of the returned beams, routed to any one of the input/output fundamental mode waveguides, characterised in that the means for altering the relative phases between the plurality of beams comprises a means for varying the cross-sectional dimensions of a portion of one or more of the relay waveguides.

According to a fifth aspect of the invention, an optical phase shifter comprises a hollow core optical waveguide, characterised in that the phase shifter comprises means for varying the internal cross-sectional dimensions of a portion of said hollow core optical waveguide. The optical phase shifter may be used in an MMI device, or any optical device where a phase shifting function is required.

Figure 2A:
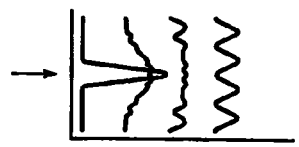
Figure 2B:
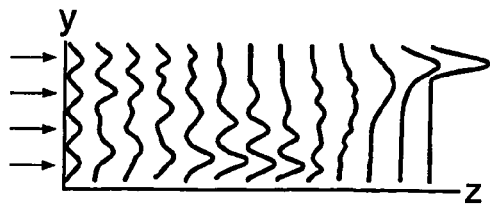
Figure 2C:
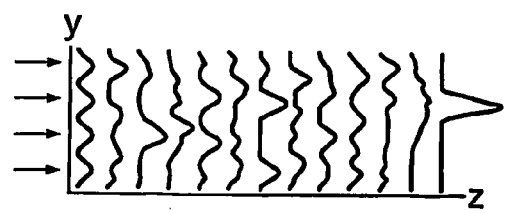
Figure 3:
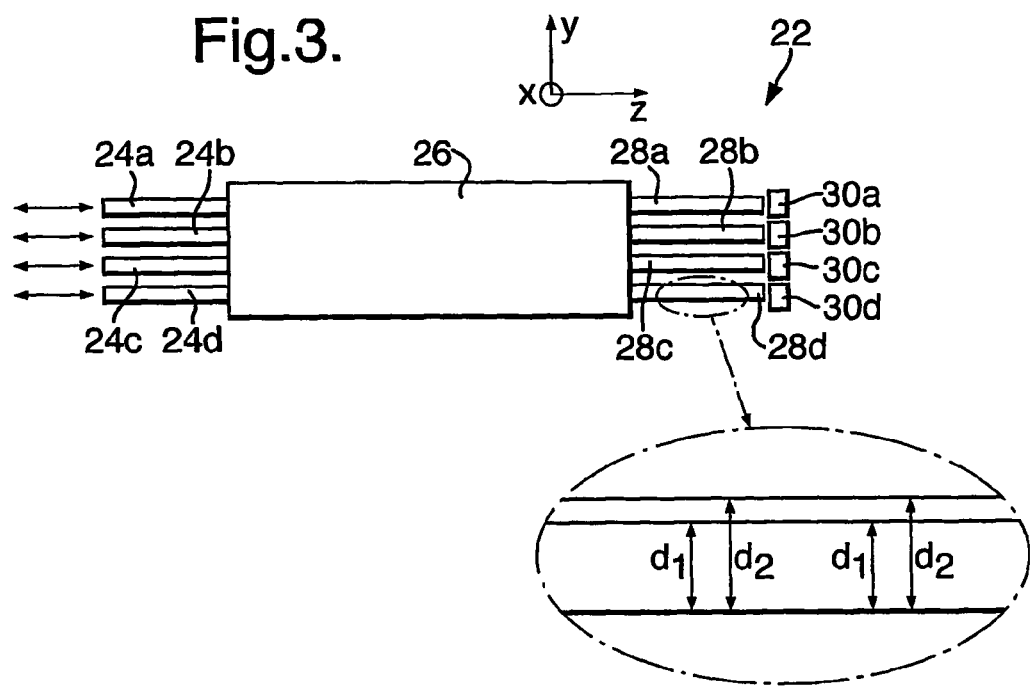

The invention will now be described, by way of example only, with reference to the following figures in which;

FIG. 1 shows an optical routing device according to the present invention,

FIG. 2 illustrates the propagation of radiation in a device of the type described with reference to FIG. 1, FIG. 3 shows a star coupler optical routing device according to the present invention, FIG. 4 illustrates the propagation of radiation in a device of the type described with reference to FIG. 3, and FIG. 5 shows a theoretical plot of the amount of waveguide side-wall movement required to impart a $\pi$ phase shift to light of 1.55 µm wavelength propagating through a 10 mm long fundamental mode waveguide.

Referring to FIG. 1, an optical routing device 2 according to the present invention is shown. The optical routing device 2 comprises a multi-mode interference (MMI) beam splitting portion 4 and an MMI beam recombining portion 6.

The beam splitting portion 4 comprises a fundamental mode input waveguide 8 that is optically linked to a multi-mode waveguide region 10. The dimensions of the multi-mode waveguide region 10 are selected such that modal dispersion causes the fundamental mode beam received from the input waveguide 8 to be substantially equally divided between the four fundamental mode relay waveguides 12a to 12d (referred to collectively as 12).

The multi-mode waveguide region 14 of the beam recombining portion 6 receives light from each of the four fundamental mode relay waveguides 12. The dimensions of the multi-mode waveguide region 14 are selected such that, depending on the relative phase of the light received from the relay waveguides, a fundamental mode may be excited in any one or more of the fundamental mode output waveguides 16a to 16d (referred to collectively as 16).

A detailed description of the necessary dimensions of the multi-mode regions 10 and 14 can be found elsewhere; for example see U.S. Pat. No. 5,428,698.

Control of the relative phase of light injected into the multi-mode waveguide region 14 from the relay waveguides is achieved by varying the width (d) of one or more of the relay waveguides by moving one of the side walls that forms the hollow waveguide. A detailed description of the amount of side wall movement required to impart a required phase shift is described in more detail with reference to FIG. 5. An expanded view of the relay waveguide 12d is also given in FIG. 1, and illustrates how the width of the relay waveguide can be varied between $d_1$ and $d_2$.

A person skilled in the art would recognise that one side wall could be moved as shown in FIG. 1, or that the device could be configured to provide movement of both side walls. It would also be recognised by the skilled person that a portion of the relay waveguide could be varied in width whilst the width of the remaining portion is kept constant or varied by a different amount. The phase shift introduced by side wall movement will depend on both the amount of side wall movement and also the length of the portion of the side wall which is moved; this is described in more detail below with reference to FIG. 5. Control of side wall movement in the relay waveguides can thus be used to introduce relative phases shifts such that the fundamental mode beam to be coupled into any one or more of the fundamental mode output waveguide 16 as required.

As described above, variation of the relay waveguide width provides a convenient way of introducing a relative phase shift between the light propagating through the relay waveguides. A device of the present invention can thus handle higher optical power than routers of the type described in U.S. Pat. No. 5,428,698 that employ transmissive electro-optic modulators. Furthermore, certain disadvantages associated with the use of moveable mirror phase shifting means (e.g. the requirement for beam cross over and the precision of mirror alignment) are also mitigated.

The relay waveguide width may be controllably varied (e.g. using an MEMS actuator) to impart a desired phase shift as described above. Alternatively, the waveguide width may be varied by an externally applied force and the resulting phase shift measured. A motion or displacement sensor may thus be provided in which an external force is used to alter the internal cross-sectional dimensions of the waveguide.

In particular, a motion and/or displacement sensor arrangement could be readily implemented using a device of the kind described with reference to FIG. 1 but having only two relay waveguide and two output waveguides. In such an arrangement, the phase shift imparted by changing the width of a relay waveguide by application of an external force may be used to alter the proportion of light split between two output waveguides. In such a movement sensing device, a sufficiently large change in guide width (as described with reference to FIG. 5 below) could result in complete switching of the output beam from one output guide to the other (i.e. a Pi phase shift). This switching effect could be measured using photodetectors; such photo-detectors may be integrated into the device. Multiples of the Pi phase shift could be counted as cycles of the output beam/signals, whilst fractions of the increment could be measured in terms of the relative output powers directed to the two output waveguides.

Referring to FIG. 2, the basic principle underlying the multi-mode interference effect that provides beam splitting and beam recombination in a device of the type described with reference to FIG. 1 is shown.

FIG. 2a illustrates transverse intensity profiles of electromagnetic radiation at four positions along the multi-mode waveguide region 10 of the MMI beam splitting portion 4. It can be seen that the fundamental mode input beam entering the multi-mode waveguide region 10 via the input waveguide 8 is split into four equal intensity beams that are coupled into the relay waveguides 12.

FIGS. 2b and 2c show transverse intensity profiles of electromagnetic radiation at thirteen positions along the multi-mode waveguide region 14 of the MMI beam recombining portion 6 with two different sets of phase shift applied to light propagating through the relay waveguides 12.

FIG. 2b illustrates how a first set of phase shifts applied by the relay waveguides 12 allows radiation to be routed to output waveguide 16a, whilst FIG. 2c illustrates how a second set of phase shifts will route radiation to output waveguide 16b.

Radiation may also be routed to output waveguides 16c and 16d by application of appropriate phase shifts. More details concerning the appropriate phase shifts can be found in U.S. Pat. No. 5,428,698.

Referring to FIG. 3, a star coupler routing device 22 of the present invention is shown. The device 22 comprises input/output waveguides 24a to 24d (referred to collectively as 24), a multi-mode waveguide region 26 and relay waveguides 28a to 28d (referred to collectively as 28). Each of the relay waveguides 28a to 28d has a moveable side wall and is terminated by fixed mirrors 30a to 30d (referred to collectively as 30). The device 22 can thus be seen to be essentially half of the device 2 with fixed mirrors added. A detailed description of the required dimensions of the multi-mode region of such star coupler devices is also given elsewhere; for example see U.S. Pat. No. 5,428,698.

In operation, radiation enters the multi-mode waveguide region 26 via any one of the input/output waveguides 24 and modal dispersion in the multi-mode waveguide region 26 causes the radiation to be divided into four equal intensity beams that are coupled in to each of the relay waveguides 28. The relative phase of the fundamental mode radiation returned to the multi-mode region by each relay waveguide after reflection by the fixed mirrors 30 is controlled by varying the width of the relay waveguides. A calculation of the amount of side wall movement required to impart the required phase shifts is described in more detail below.

It should be noted that the beam passes through the relay waveguides in the star coupler device twice (i.e. before and after reflection from the mirror). Hence the induced phase shift is double that which would be produced by a single passage through the waveguide. In a manner analogous to that described with reference to FIG. 1, appropriate selection of the relative phase shift imparted by the relay waveguides thus allows an output beam to be routed from the device via any one or more of the input/output waveguides 24.

Referring to FIG. 4, transverse intensity profiles of electromagnetic radiation propagating through the multi-mode waveguide region 26 of the device described with reference to FIG. 3 are shown.

Figure 4A:
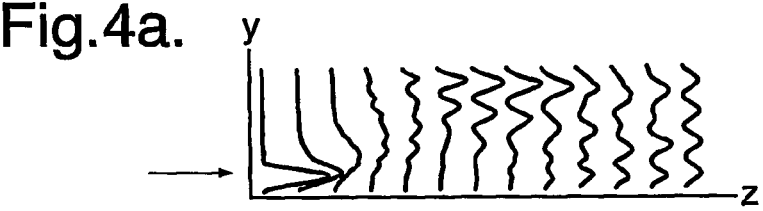
Figure 4B:
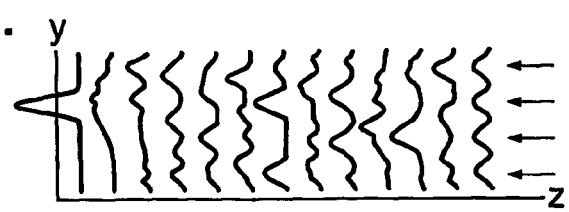
Figure 4C:
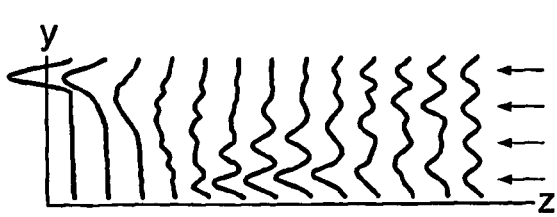

FIG. 4a illustrates how fundamental mode radiation coupled into the multi-mode waveguide region 26 from the input/output waveguide 24d is split into four equal intensity beams by modal dispersion. FIGS. 4b and 4c illustrate how modal dispersion of the four equal intensity beams, after appropriate relative phase shifts are applied by the relay waveguides, can form a beam in a location such that it is coupled into the input/output waveguides 24b or 24a respectively. Again, it should be noted that the application of appropriate phase shifts by the relay waveguide can route an output signal to any one or more of the input/output waveguides 24.

Although FIGS. 1 and 3 show devices providing a four way splitting/recombining function, the invention is generally applicable to MMI devices providing an N-way splitting/recombining function where N is greater than or equal to two. Details on the dimensions required for N-way routing are described elsewhere; for example see U.S. Pat. No. 5,428,698 or U.S. Pat. No. 5,410,625.

Devices of the type described with reference to FIGS. 1 and 3 are conveniently formed as hollow channels in a silicon-based substrate using various known semiconductor micro-fabrication techniques; for example photolithography or deep dry etching. Silicon-based substrates suitable for use in the fabrication of such devices include bulk silicon, silicon on insulator (SOI), silicon on glass (SOG) and silicon on sapphire (SOS). Alternatively, known micro-engineering techniques (e.g. hot embossing or laser ablation) can be used to form hollow channels in a layer, such as a polymer, located on the surface of the wafer.

The hollow channels may be provided with moveable side walls using micro-electromechanical systems (MEMS) technology; also termed microsystems technology (MST). Known actuation mechanisms used in MEMS include those employing electrostatic, electrothermal, electromagnetic, piezoelectric, electrostrictive, magnetostrictive, bimetallic, shape memory alloy, chemical and physical (mechanical) properties. More detail on MEMS device actuation technologies and the associated fabrication techniques can be found in "fundamental of Microfabrication" by Marc Madou, published by CRC Press (Boca Raton) in 1997; ISBN 0-8493-9451-1.

In particular, the movable side walls may be implemented using technology presently used to provide MEMS movable mirrors. For example, see "MEMS and MOEMS Technology and Applications", P. Rai-Choudhury, SPIE (Bellingham), 2000 (ISBN 0-8194-3716-6) and "Micromachined transducers sourcebook", G. T. A. Kovacs, McGraw Hill (New York), 1998 (ISBN 0-07-290722-3). Known MEMS movable mirrors vary in size from dimensions of the order of a few microns to several millimetres, and the amount of motion ranges from deep sub-micron to of the order of a few hundred microns. The amount of sidewall movement required to implement the present invention (as described with reference to FIG. 5 below) can be readily obtained using such MEMS techniques.

It should be noted that the moveable side wall sections may be formed integrally with the fixed side wall portions, or may be fabricated separately and integrated in a hybrid fashion to a substrate in which the fixed hollow channels are defined.

To ensure optimum device performance, the moveable side wall (or relevant portion of the side wall) should be linearly translatable without inducing any significant distortion to its shape. This can be accomplished by having an appropriate suspension system to effectively force a linear motion; i.e. a system which is compliant in the direction of desired motion but stiff to other (e.g. rotational) motions. A suitable suspension system can be provided using high aspect ratio (i.e. high depth to width ratio) springs to prevent twist. Similarly, the suspension elements can be appropriately dimensioned with respect to the movable wall such that the translation is effectively accommodated entirely in the suspension (e.g. much more compliant) thereby preventing distortion.

As described in WO 03/065088 a reflective coating may also be applied to the surfaces forming the hollow core waveguides to enhance reflectivity and thereby reduce optical losses associated with the device.

A person skilled in the art would appreciate that light can be coupled into or out of the fundamental mode waveguides of the devices described with reference to FIG. 1 to 4 in many ways. For example, optical routing devices of the present invention could be coupled to other optical components via optical fibre cables or could form an integral portion of a photonic integrated circuit of the type described WO 03/065091, the contents of which are incorporated herein by reference thereto.

Referring to FIG. 5, the amount of side wall movement that is required to impart a π phase shift to light propagating in a 10 mm long fundamental mode waveguide is shown versus the waveguide width.

It is possible to consider any change in the width of the fundamental mode waveguide as a change in the effective refractive index of that waveguide. Within the paraxial approximation (i.e. where $\{\lambda/2w\}^2 \ll 1.0$), for light of wavelength $\lambda$, the change in phase ($\partial\phi$) of the fundamental mode ($EH_{11}$) for a given change in waveguide width ($\partial\phi$) can thus be expressed for a waveguide of length L and initial width w:

$$\frac{\partial\phi}{\partial w} = \frac{L\pi\lambda}{2w^3} \quad (1)$$

The change in width of a fundamental mode waveguide to impart a π phase shift to the fundamental mode radiation propagating through that waveguide can thus given by the expression:

$$\partial w = \frac{2w^3}{L\lambda} \quad (2)$$

Figure 5A:
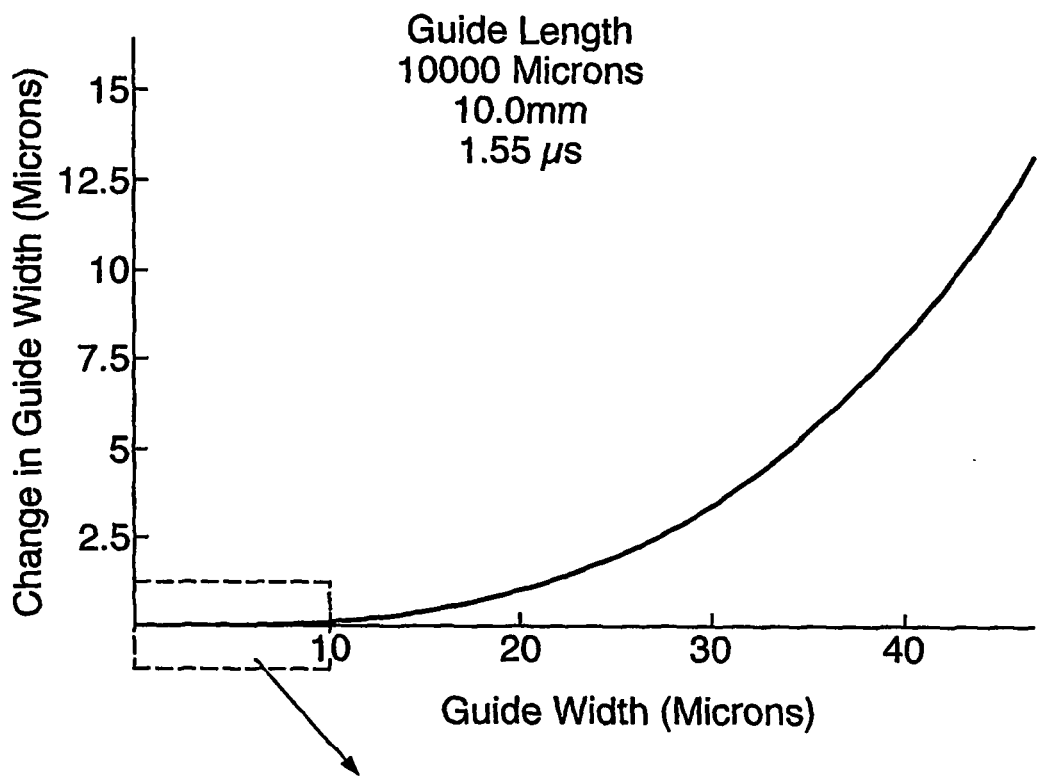
Figure 5B:
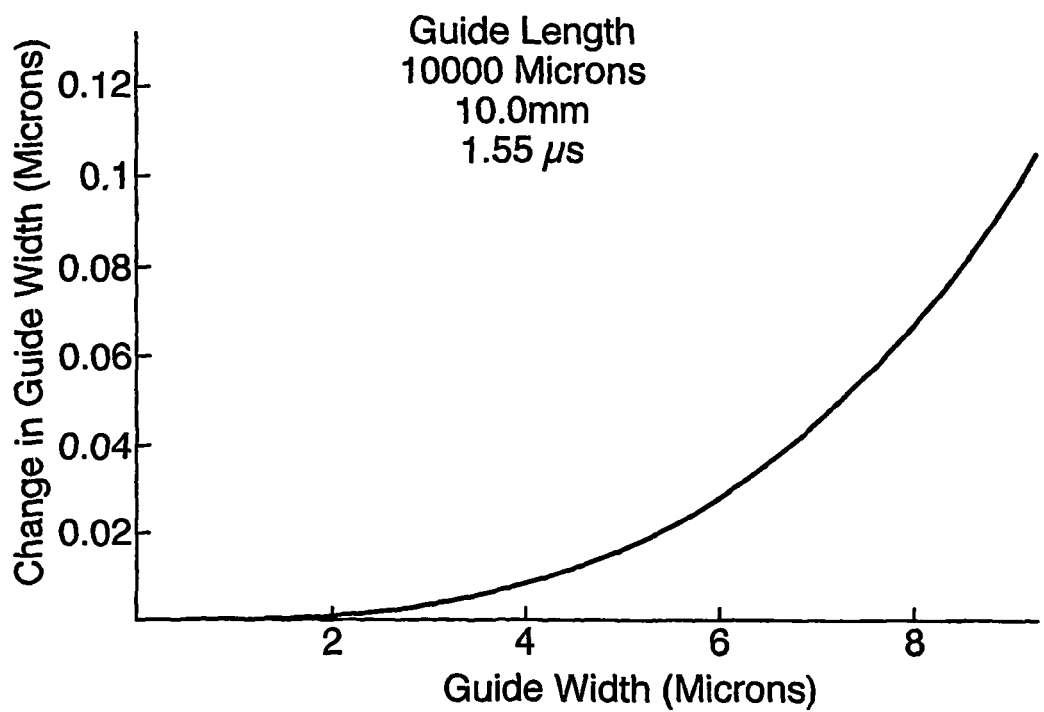

FIG. 5a shows a plot of waveguide width versus the change in waveguide width required to provide a π phase shift to light of 1.55 µm wavelength for a waveguide 10 mm in length for widths up to 50 µm. For ease of reference, FIG. 5b provides an expanded view of the data plotted in FIG. 1 for waveguide widths up to 10 µm.

FIG. 5 thus shows that for a fundamental mode waveguide having a width of around 10 µm, a change in width of 0.1 µm (i.e. around 1%) is required to impart the π phase shift required to implement an optical routing device of the type described with reference to FIGS. 1 and 3. This level of waveguide width variation can be readily obtained using MEMS technology.

Although the movement of side walls of a substantially square cross-section waveguide is described above, it should be noted that the present invention can be applied to waveguides of any cross-sectional shape. It should also be noted that any dimension of the waveguide, and not just the sidewall, may be altered to produce the required phase shift.

The invention claimed is:

1. A hollow core multi-mode interference (MMI) device comprising:
   at least two fundamental mode waveguides;
   a multi-mode waveguide optically coupled to said at least two fundamental mode waveguides; and
   a means for varying the phase of light passing through at least a portion of at least one of said at least two fundamental mode waveguides, said means for varying comprising a means for linearly translating both side walls of at least a portion of one of said fundamental mode waveguides without substantial distortion.

2. A device according to claim 1 wherein at least one of the fundamental mode waveguides has a substantially square cross-section.

3. A device according to claim 1 wherein the internal surfaces of the hollow core waveguides are coated with at least one layer of reflective material.

4. A device according to claim 1 wherein the device is formed in a semiconductor material.

5. A device according to claim 4 wherein the device is formed in silicon.

6. A device according to claim 1 wherein the means for varying comprises micro-electro-mechanical (MEMS) actuation means.

7. A device for routing radiation comprising at least one device according to claim 1.

8. A device according to claim 1 wherein the means for varying is arranged such that the fundamental mode waveguide dimensions can be varied by application of an external force.

9. A hollow core optical router comprising:
   an MMI beam splitter;
   at least one fundamental mode input waveguide optically coupled to said MMI beam splitter;
   at least two relay waveguides;
   an MMI beam recombiner having two or more fundamental mode output waveguides, said MMI beam splitter is optically coupled via said at least two relay waveguides to said MMI beam recombiner, wherein the relay waveguides include a means for altering the relative phases between at least two beams propagating though the relay waveguides such that radiation received from the fundamental mode input waveguide may be selectably routed to any one of the at least two fundamental mode output waveguides, wherein the means for altering the relative phases between the at least two beams comprises a means for linearly translating both side walls of at least a portion of one of said two relay waveguides without substantial distortion.

10. A hollow core optical router comprising:
    a multi-mode waveguide region;
    a plurality of input/output fundamental mode waveguide;
    a plurality of relay waveguides, said multi-mode waveguide region optically coupled to said plurality of input/output fundamental mode waveguides and to said plurality of relay waveguides, the router being configured to receive a beam of radiation via one of the plurality of input/output fundamental mode waveguides and, via modal dispersion in the multi-mode waveguide region, to divide the received beam into a plurality of beams that are coupled in to the relay waveguides, wherein the relay waveguides comprise a means for altering the relative phases between the plurality of beams and each relay waveguide is terminated with a reflective means such that radiation is returned to the multimode waveguide region and, dependent on the relative phases of the returned beams, routed to any one of the input/output fundamental mode waveguides, wherein the means for altering the relative phases between the plurality of beams comprises a means for linearly translating both side walls of at least a portion of one of said two relay waveguides without substantial distortion.

11. A hollow-core MMI beam combiner comprising:
    a multimode waveguide;
    N (N>=2) fundamental mode input waveguides optically coupled to one end of the multimode waveguide; and
    a fundamental mode output waveguide optically coupled to the other end of the multimode waveguide the lateral positions at which said input and output waveguides are coupled to the multimode waveguide and the length the multimode waveguide being such that radiation input to each of said N input waveguides may be combined by modal dispersion and intermodal interference within the multimode waveguide and coupled into said output waveguide, and wherein at least one of said input waveguides comprises means for varying the cross-sectional dimensions of a portion of that input waveguide.

12. A hollow-core MMI beam splitter device comprising:
    a multimode waveguide;
    a fundamental mode input waveguide optically coupled to one end of the multi-mode waveguide; and
    N (N>=2) fundamental mode output waveguides optically coupled to the other end of the multimode waveguide, the lateral positions at which said input and output waveguides are coupled to the multimode waveguide and the length the multimode waveguide being such that radiation input to said input waveguide is divided into N portions by modal dispersion and intermodal interference in the multimode waveguide, each portion being coupled into a respective output waveguide, and wherein at least one of said output waveguides comprises means for varying the cross-sectional dimensions of a portion of that output waveguide.

* * * * *